United States Patent
Levin-Michael et al.

(10) Patent No.: US 10,346,256 B1
(45) Date of Patent: Jul. 9, 2019

(54) CLIENT SIDE CACHE FOR DEDUPLICATION BACKUP SYSTEMS

(71) Applicant: EMC IP Holding Company LLC, Hopkinton, MA (US)

(72) Inventors: Orit Levin-Michael, Irvine, CA (US); Scott Clifford Auchmoody, Irvine, CA (US); Scott H. Ogata, Lake Forest, CA (US); Qun Fan, Irvine, CA (US); Salil Dangi, Mission Viejo, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1009 days.

(21) Appl. No.: 14/577,469

(22) Filed: Dec. 19, 2014

(51) Int. Cl.
  *G06F 16/30* (2019.01)
  *G06F 11/14* (2006.01)
  *H04L 29/08* (2006.01)

(52) U.S. Cl.
  CPC ...... *G06F 11/1453* (2013.01); *H04L 67/2842* (2013.01); *G06F 2201/80* (2013.01)

(58) Field of Classification Search
  USPC .......................................................... 707/644
  See application file for complete search history.

(56) References Cited

U.S. PATENT DOCUMENTS

| 6,810,398 | B2 | 10/2004 | Moulton | |
|---|---|---|---|---|
| 8,392,384 | B1* | 3/2013 | Wu | G06F 17/30156 707/693 |
| 2009/0324100 | A1* | 12/2009 | Kletter | G06K 9/00442 382/217 |
| 2014/0089307 | A1* | 3/2014 | Garside | G06F 17/30023 707/736 |

* cited by examiner

*Primary Examiner* — Irete F Ehichioya
*Assistant Examiner* — Johnese T Johnson
(74) *Attorney, Agent, or Firm* — Van Pelt, Yi & James LLP

(57) ABSTRACT

Protected data is divided into a plurality of segments. For each segment in the plurality of segments, a fingerprint is generated. The plurality of fingerprints is grouped into group(s) of fingerprints and for each group of fingerprints, a group fingerprint is generated. It is determined if the group fingerprint being processed is stored in a cache and if so, the group fingerprint being processed is flagged as one for which a virtual copy will be performed.

23 Claims, 10 Drawing Sheets

Cache 1 for Dataset 1 — 720

| Group Fingerprint | Previous BU | Offset | Length |
|---|---|---|---|
| $GF_{Dataset1,1}$ | $BU_{Dataset1,1}$ | 0 | $L_W$ |
| $GF_{Dataset1,2}$ | $BU_{Dataset1,1}$ | $L_W$ | $L_X$ |
| | | | |

Cache 2 for Dataset 2 — 730

| Group Fingerprint | Previous BU | Offset | Length |
|---|---|---|---|
| $GF_{Dataset2,1}$ | $BU_{Dataset2,1}$ | 0 | $L_Y$ |
| $GF_{Dataset2,2}$ | $BU_{Dataset2,1}$ | $L_Y$ | $L_Z$ |
| | | | |

| Group Fingerprint | PREV BU | Offset | Length | Checksum |
|---|---|---|---|---|
| $Hash_2(Hash_1(S_1), Hash_1(S_2))$ | $BU_1$ | 0 | $L_1$ | $CS(S_1, S_2)$ |
| $Hash_2(Hash_1(S_3), Hash_1(S_4))$ | $BU_1$ | $L_1$ | $L_2$ | $CS(S_3, S_4)$ |
| $Hash_2(Hash_1(S_5), ..., Hash_1(S_7))$ | $BU_1$ | $L_1+L_2$ | $L_3$ | $CS(S_5, S_6, S_7)$ |
| | | | | | ns
CLIENT SIDE CACHE FOR DEDUPLICATION BACKUP SYSTEMS

BACKGROUND OF THE INVENTION

Deduplication backup systems, such as EMC's Data Domain systems, use deduplication to perform backup that store much less data on backup server. Instead of copying the same data over and over again from the protected device to the backup server, deduplication backup systems first identify whether pieces of the protected data have already been backed up. If so, that piece of protected data does not need to be sent over the network from the protected device to the backup server. Instead, a reference or a virtual copy is performed from one location on backup storage to another location on backup storage. It would be desirable to reduce the backup times by improving the speed at which duplicate information is recognized and/or to reduce the amount of network traffic. Although deduplication backup systems offer faster backup times, it would be desirable if the performance of current deduplication backup systems could be further improved. It would also be desirable if such improvements could be implemented in a manner that requires relatively few changes to current deduplication backup systems.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
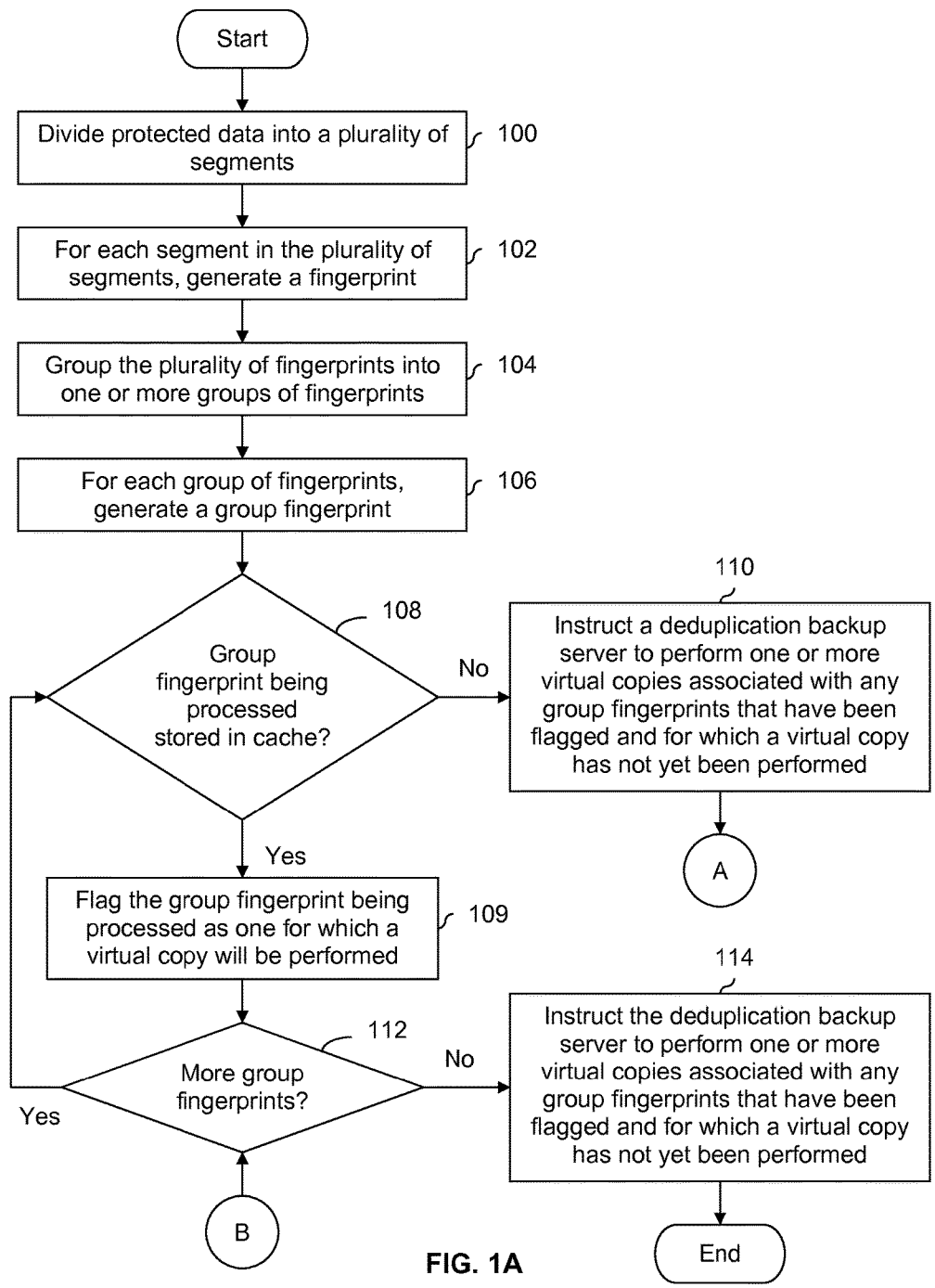
FIG. 1A is a flowchart illustrating an embodiment of a process for performing deduplication backup.

FIG. 1A is a flowchart illustrating an embodiment of a process for performing deduplication backup. In some embodiments, the process is performed by a deduplication backup client running on a protected device. In some embodiments, the process is performed by a proxy device (e.g., a third device which is neither the protected device nor a (deduplication) backup server. In some embodiments, the process is repeated each time a backup is performed on a given dataset (where a dataset is a designated set of protected data, where different datasets can have different backup frequencies, retention rules, etc.) on a protected device.

At 100, protected data is divided into a plurality of segments. In some embodiments, an anchoring process already used by a deduplication backup client is used to divide the data into segments. For example, if the protected data comprises a file or database, then the anchoring process is used to divide the file or database into multiple segments. In some embodiments, a segment includes data from two different objects (e.g., data from a first file and a second file). In some embodiments, the segments generated at step 100 have variable lengths. That is, it is not necessary for the segments generated at step 100 to have the same length.

At 102, for each segment in the plurality of segments, a fingerprint is generated. As used herein, a fingerprint refers to a representative value of a segment which changes when the value of the segment changes. To put it another way, a fingerprint does not change so long as the value of the segment remains the same. In one example, a fingerprint is a hash of the segment. To ensure that the same segment value produces the same fingerprint again if the process repeated again later, in embodiments where a hash is used, the hash is not salted so that the same fingerprint can be repeatedly generated for the same segment value. In some embodiments, a hash already being used by a deduplication backup client is used to generate the fingerprints at step 102.

At 104, the plurality of fingerprints is grouped into one or more groups of fingerprints. In some embodiments, an anchoring process is used to perform the grouping at step 104. In some embodiments, a different anchoring process is used at step 100 compared to step 104. For example, in some applications it may be desirable to have two anchoring processes that can be tuned independently for different performance goals and/or system characteristics. For example, whereas it is acceptable at step 100 to divide the protected data at any byte, at step 104 the boundaries or divisions should only occur at fingerprint boundaries as opposed to any byte.

In some embodiments, the configurations or settings of an anchoring process (e.g., that control the size of an average or nominal group of fingerprints at step 104) are set based on one or more environmental inputs. For example, depending upon the amount of memory allocated for the cache, the amount of protected data, and/or a desired cache hit rate, the size of a group of fingerprints will tend to be larger or smaller. In some embodiments, such environmental or system inputs are obtained when a deduplication backup system is installed. It is noted that once the configurations or settings of an anchoring process are set (e.g., based on available memory, etc.), those configurations are not changed to ensure consistency between backups and avoid unnecessary cache misses.

At 106, for each group of fingerprints, a group fingerprint is generated. In some embodiments, a hash is used and the hash may or may not be the same hash as one used at step 102. Like fingerprints, group fingerprints remain the same so long as the group of fingerprints does not change. If, however, one or more of the fingerprints in the group change, then the value of the group fingerprint changes.

In some embodiments, steps 100, 102, 104, and 106 are implemented as a pipeline. To put it another way, steps 100, 102, 104, and 106 may operate simultaneously on data at different stages in the process.

At 108, it is determined if the group fingerprint being processed is stored in a cache. This cache is sometimes referred to herein as a client-side cache or as a cache on a protected device (e.g., for those embodiments where a backup client is running on a protected device). Naturally, if the process is being performed by a proxy device then the cache may be on the proxy device and not the protected device.

If the group fingerprint being processed is stored in the cache at 108, then at 109 the group fingerprint being processed is flagged as one for which a virtual copy will be performed. As used herein, a virtual copy is a copy process in which data is not copied from a protected device to a deduplication backup server (e.g., over a network), but is rather identified as data that has already been backed up during a previous backup, for example by identifying that earlier backup, some offset from the beginning of that earlier backup, and a length starting from that offset. A virtual copy is faster than transferring the protected data over the network from the protected device to backup storage, so identifying duplicate data and performing virtual copies is desirable.

If the group fingerprint being processed is not stored in the cache at 108, then at 110 a deduplication backup server is instructed to perform one or more virtual copies associated with any group fingerprints that have been flagged and for which a virtual copy has not yet been performed. For example, a backup client running on a protected device may send a virtual copy instruction to a deduplication backup server that identifies a data range in the current backup (e.g., identified by an offset and a length from that offset), the previous backup which includes the identical data, and a data range within that previous backup (e.g., identified by an offset and a length from that offset).

In some embodiments, step 110 includes consolidating two or more group fingerprints (all of which are stored in the cache and all of which are sequential or adjacent to one another such that they can be referenced using a single previous backup, a single offset, and a single length) into a single virtual copy command. This consolidation is enabled by the flagging step at 109, for example because the process waits to see how many group fingerprints "in a row" are stored in the cache before actually executing the virtual copy command at step 110. Consolidating multiple group fingerprints that are stored in the cache into a single virtual copy command is more efficient, for example, than having multiple virtual copy commands, each of which refers to a smaller amount of data.

After flagging at step 109, it is determined at 112 if there are more group fingerprints. If so, it is determined at 108 if the next group fingerprint is stored in the cache. If not, the deduplication backup server is instructed to perform one or more virtual copies associated with any group fingerprints that have been flagged and for which a virtual copy has not yet been performed at 114. Note that steps 110 and 114 are the same, except step 110 will continue on to step 150 in FIG. 1B (e.g., because it has to handle the group fingerprint which was not found in the cache), whereas after step 114 the process ends (e.g., because there are no more group fingerprints to process).

Figure 1B:
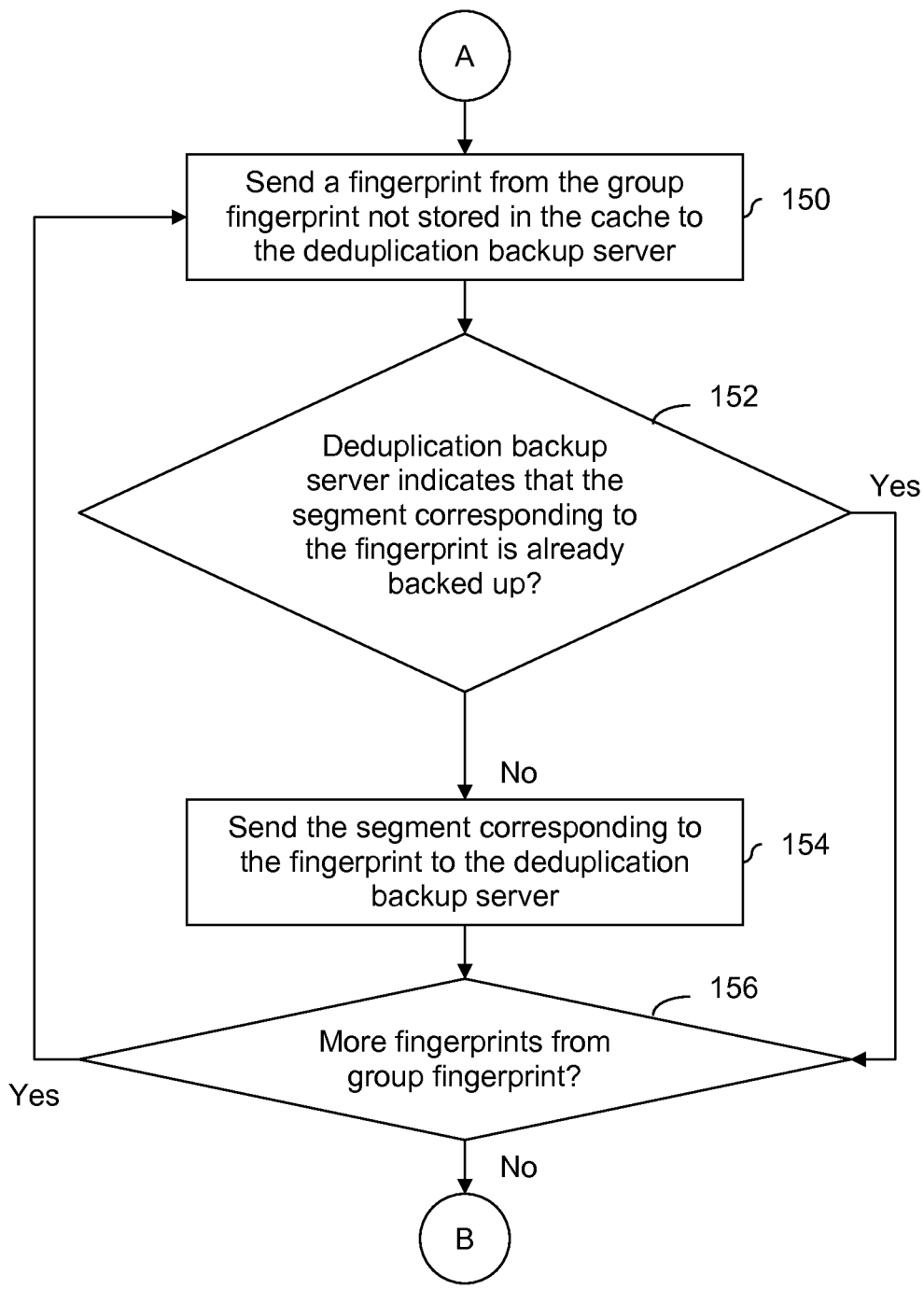
FIG. 1B is a flowchart illustrating an embodiment of a process for performing deduplication backup in the event a group fingerprint is not stored on a cache.

FIG. 1B is a flowchart illustrating an embodiment of a process for performing deduplication backup in the event a group fingerprint is not stored on a cache. The process shown herein continues the process of FIG. 1A. In some embodiments, all of the steps shown in FIG. 1B are already implemented by a deduplication backup client so no changes need to be made in order to implement these particular steps.

If it is determined at 108 that the group fingerprint being processed is not stored in the cache, then at 150 a (segment) fingerprint from the group fingerprint not stored in the cache is sent to the deduplication backup server. For example, if four fingerprints are grouped together to generate a group fingerprint (and that group fingerprint was not found in the cache), then one of the four fingerprints is sent to the deduplication backup server. At the deduplication backup server, the deduplication backup server uses the fingerprint to determine if the corresponding segment has already been backed up by the system.

At 152, it is determined if a deduplication backup server indicates that the segment corresponding to the fingerprint is already backed up. For example, a deduplication backup client running on a protected device may wait for a communication from the deduplication backup server indicating whether or not the segment corresponding to the fingerprint has already been backed up.

If the segment corresponding to the fingerprint is not already backed up, then at 154 the segment corresponding to the fingerprint is sent to the deduplication backup server. For example, if a user inserted new content into a file, then the segment(s) which include the new content would be sent to the deduplication backup server (e.g., over a network) since they have not been backed up before.

After step 154 or if it is determined at 152 that a segment corresponding to the fingerprint is already backed up, it is determined at 156 whether there are more fingerprints from the group fingerprint. If so, a next fingerprint from the group fingerprint is sent to the deduplication backup server at 150. If there are no more fingerprints in the group fingerprint, the process returns to step 112 in FIG. 1A.

It is noted that the process of FIG. 1B is from the point of view of a deduplication backup client, not a deduplication backup server. As such, if it is determined at 152 that a segment corresponding to the fingerprint is already backed up, the process proceeds to the decision at 156 where it determines if there are more fingerprints in the group fingerprint. However, at the deduplication backup server (which FIG. 1B does not reflect), the deduplication backup server specifies a reference (e.g., which is provided to a back-end, deduplication backup storage) if the decision at step 152 is "Yes." Such references which are specified by the deduplication backup server are outside of the scope or view of the deduplication backup client and as such are not described in FIG. 1B (e.g., from the point of view of the deduplication backup client, the deduplication backup server is silent with respect to the already backed up segment since all of the action is at the back-end).

Conversely, from the point of view of the deduplication backup server, the server is unaware of group fingerprints. The deduplication backup server only knows about (segment) fingerprints (e.g., created using only $Hash_1$). The client-side creates the group fingerprints to better manage the memory resource requirement for the cache and CPU usage for cache lookup. For example, if the average group size is 32 segment fingerprints then the memory requirement is reduced by a factor of 32 compared with the client that caches the segment fingerprints and the CPU requirement may go down by a factor of 5 if binary search is being used since the amount of entries is reduced by a factor of 32.

A benefit to the process shown in FIGS. 1A and 1B is that deduplication backup can be performed faster, especially for very large systems with lots of data. Some other deduplication backup systems send fingerprints for all segments to the deduplication backup server, which consumes a significant amount of network bandwidth (e.g., since many fingerprints are sent over the network) and creates a significant processing load at the deduplication backup server. By having a cache on the client side, the deduplication backup client can figure out (for at least some of the protected data being backed up) if protected data has already been backed up without consuming network bandwidth and without using deduplication backup server processing resources.

It is possible to just cache all segment fingerprints. However, for large streams of data, the cache memory requirement becomes so high that it is not practical. As an example, if the stream is 8 TB long and if each segment fingerprint on average protects 8 KB of data, then we have 1B segment fingerprints from each backup. If the cache were also allowed to hold prior backup data this number will go higher. This is just not practical in terms of RAM and the CPU power to perform lookups with 1B entries. In a realistic memory allocation size many segment FPs will left out of cache what will lead to lower cache hit By combining segment fingerprints into group fingerprints, a smaller number of group fingerprints is achieved. For the same example, if an average of 32 segment fingerprints converge to a group fingerprint, there will only be ~31 M group fingerprints (e.g., compared to 1B segment fingerprint), the memory requirement goes down accordingly and lookups will be much more efficient. Although there may be fewer cache hits with group fingerprints compared to a "perfect" segment fingerprints, the fact is the cache requirements for segment fingerprint is not practical, and group fingerprints produce a huge improvement.

Still another benefit to the process shown in FIGS. 1A and 1B is that it is possible to implement the process with relatively few changes to current deduplication backup systems. For example, deduplication backup server(s) currently offered by EMC Data Domain already expose or otherwise make available for use a virtual synthesis interface (e.g., for use at step 110 if a group fingerprint is found in a client-side cache) and a segment fingerprint lookup interface (e.g., for use at step 150 if a group fingerprint is not found in a client-side cache). Therefore, it is not necessary to make any changes on the server side. This makes implementation and verification much easier than if changes had to be made on both the client side and the server side.

The following figures further illustrate various aspects and/or embodiments of the process shown in FIGS. 1A and 1B. First, a deduplication backup system is described so that various exemplary components can be described. Then, an example that goes through the process of generating a group fingerprint is described.

Figure 2:
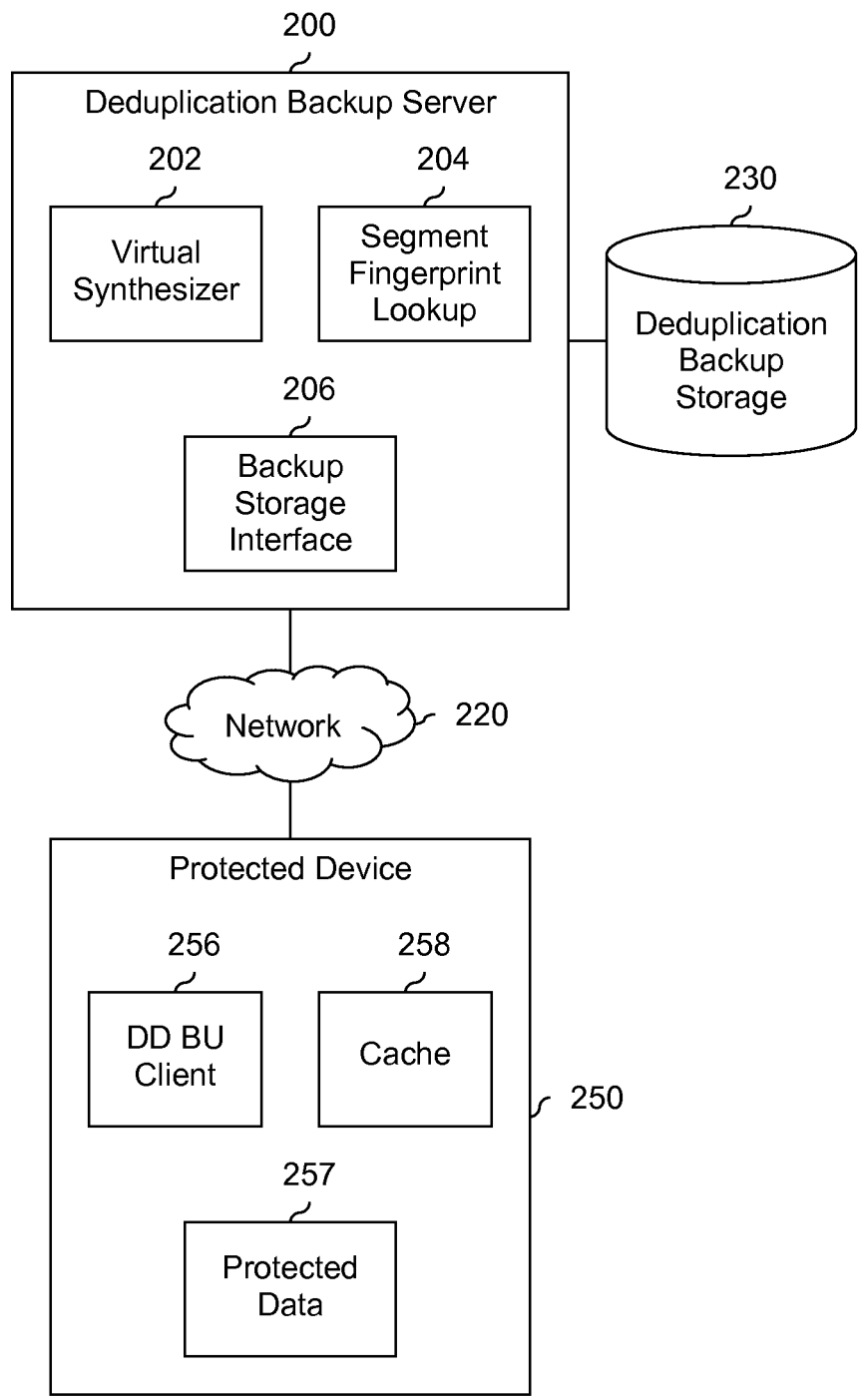
FIG. 2 is a diagram illustrating an embodiment of a deduplication backup system.

FIG. 2 is a diagram illustrating an embodiment of a deduplication backup system. Deduplication backup client 256 running on protected device 250 is one example of a device or component which performs the process of FIGS. 1A and 1B. As described above, in some other embodiments a proxy device (e.g., other than protected device 250) may perform the process of FIGS. 1A and 1B.

In the example shown, deduplication backup server 200 communicates with protected device 250 via network 220. Backup data from protected device 250 is stored in deduplication backup storage 230, which is connected to and managed by deduplication backup server 200. In some embodiments, deduplication backup storage 230 includes multiple storage devices. Deduplication backup server 200 includes virtual synthesizer 202, segment fingerprint lookup 204, and backup storage interface 206. Protected device 250 includes deduplication backup client 256, protected data 257, and cache 258. For clarity, only a single backup storage device (230) and a single protected device (250) are shown, but a system may include any number of these and other devices.

In one example of step 110 in FIG. 1A, deduplication backup client 256 communicates with virtual synthesizer 110 in order to perform a virtual copy. For example, suppose a group fingerprint associated with at least some portion of the protected data (not shown) has been found in cache 258. The cache entry which includes the group fingerprint also identifies a previous backup (e.g., having a certain backup timestamp), an offset from the beginning of that previous backup, and a length beginning from the offset. In one example, deduplication backup client 256 communicates to virtual synthesizer 202 that data range [X, Y] of current backup $BU_{current}$ may be found in a previous backup BU previous, beginning at an offset of O (e.g., in bytes) and having a length of L (e.g., in bytes).

In one example of step 150 in FIG. 1B, deduplication backup client 256 sends a fingerprint to segment fingerprint lookup 204. If segment fingerprint lookup 204 is able to find the fingerprint (e.g., because the corresponding segment has already been backed up), then the decision at step 152 would be "Yes." If not, the decision at step 152 would be "No" and the process of FIG. 1B would go to step 154.

In one example of step 154, deduplication backup client 256 sends a given segment to backup storage interface 206. In response, backup storage interface 206 stores the segment in backup storage 230. The (segment) fingerprint is recorded so that if that same fingerprint is ever received again, segment fingerprint lookup 204 knows that the corresponding segment has already been backed up.

Figure 3:
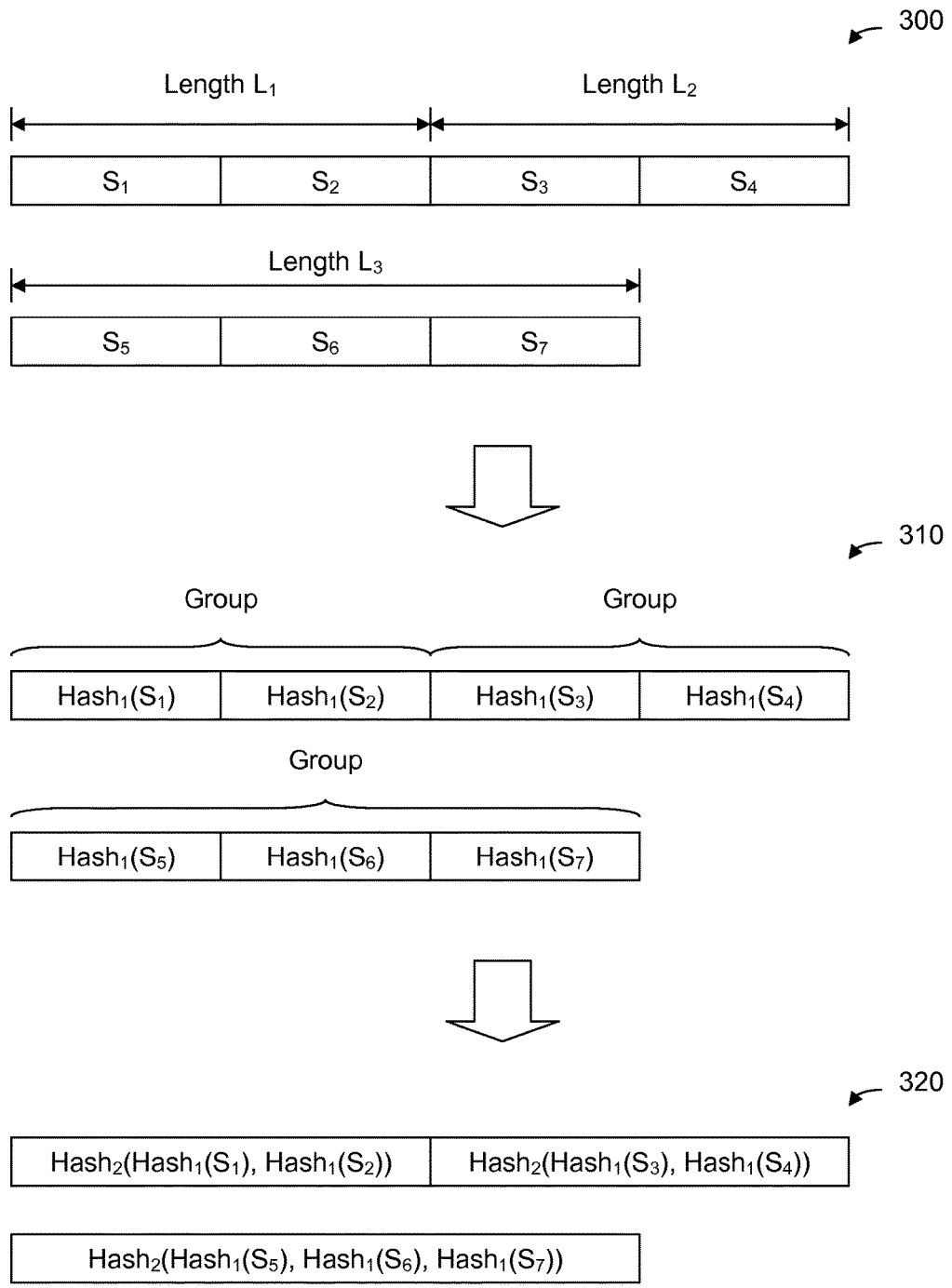
FIG. 3 is a diagram illustrating an embodiment of generation of a group fingerprint.

FIG. 3 is a diagram illustrating an embodiment of generation of a group fingerprint. In the example shown, a dataset being backed up includes files (not shown). Using an anchoring process, the files are divided up into 7 segments at 300. Note that the figures are not to scale and although it may appear that the segments are of equal size, the segments may be of different sizes (e.g., the size of $S_1$ is not necessarily the same size as $S_2$, and the size of $S_2$ is not necessarily the same size as $S_3$). Segment boundaries do not necessarily match file boundaries (or, more generally, object boundaries) and a single segment may include data from two different files (objects).

At 310, fingerprints are then generated for each of the segments, and the fingerprints are then grouped (e.g., using an anchoring process). In this example, a first hash (i.e., $Hash_1$) is used to generate the fingerprints from the segments. The first and second fingerprints are grouped together and the third and fourth fingerprints are grouped together using an anchoring process. Similarly, fingerprints are generated from the last 3 segments and the resulting 3 fingerprints are grouped together using an anchoring process to create a third group. As is shown in this example, the number of fingerprints per group and/or size of each group may vary (e.g., the size in bytes of the first group may not be the same as the size in bytes of the second group). In some embodiments, some other anchoring process besides the one which was used to generate the segments at 300 is used to group the fingerprints at 310.

From each of the groups of (segment) fingerprints, a group fingerprint is generated at 320. In this example, a first hash is used to generate the fingerprints and a second hash (i.e., $Hash_2$) is used to generate the group fingerprints.

The following figures describe various example backup scenarios which may be encountered. First, an initial backup is described in which the client-side cache is empty. A later backup is then described in which the client-side cache contains some, but not all, of the group fingerprints for that particular backup.

Figure 4:
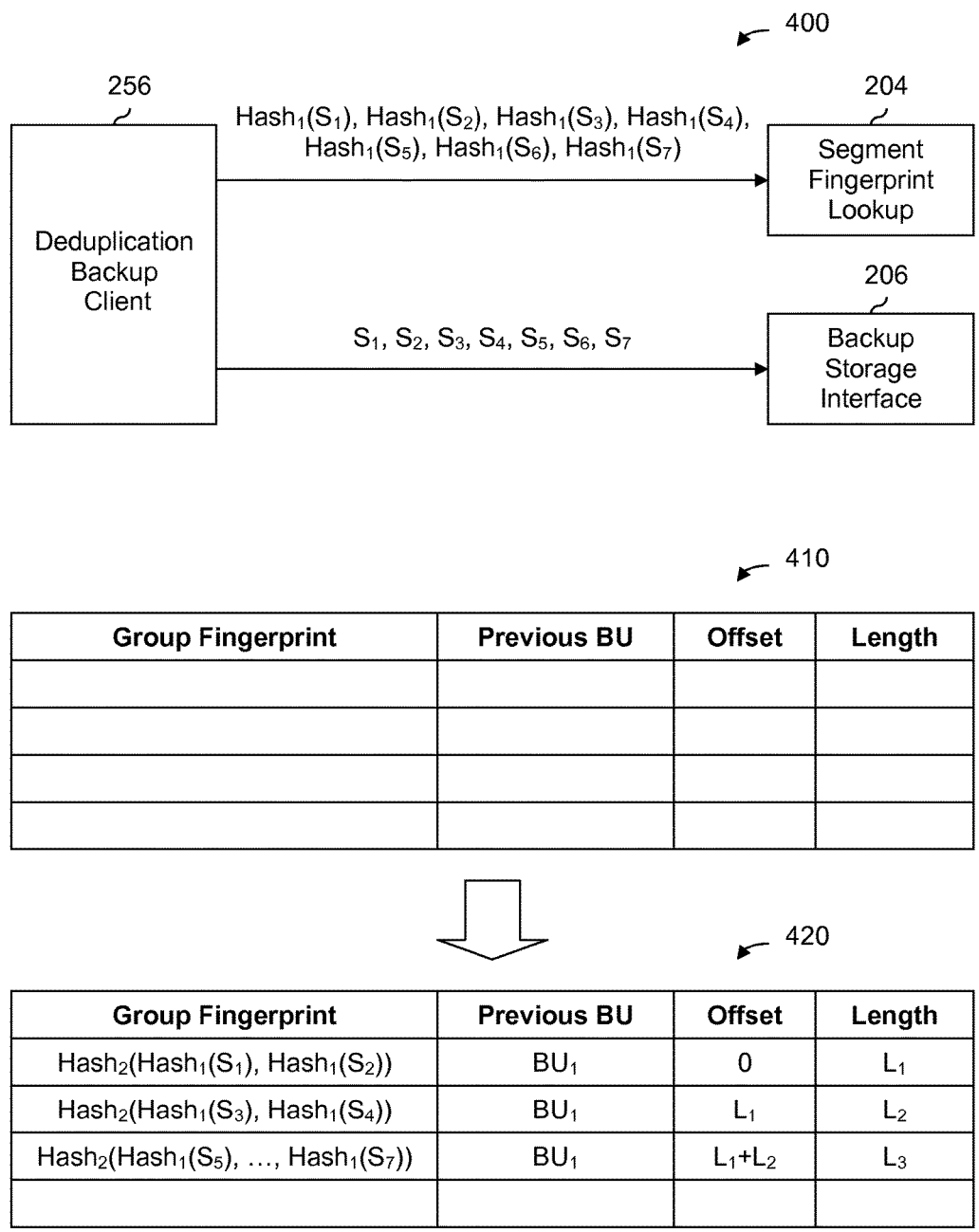
FIG. 4 is a diagram illustrating an embodiment of an initial backup.

FIG. 4 is a diagram illustrating an embodiment of an initial backup. In the example shown, the backup being performed is the first or initial backup and continues the examples shown in FIGS. 2 and 3. The backup which is being performed in this example is referred to as $BU_1$.

Diagram 410 shows the state of a client-side cache before the initial backup and (as expected) it is empty. Since the cache is empty, none of the group fingerprints shown in FIG. 3 are found in the client-side cache. As a result, in diagram 400, deduplication backup client 256 sends the segment hashes (i.e., $Hash_1(S_1)$, $Hash_1(S_2)$, $Hash_1(S_3)$, $Hash_1(S_4)$, $Hash_1(S_5)$, $Hash_1(S_6)$, and $Hash_1(S_7)$) to segment fingerprint lookup 204. Segment fingerprint lookup 204 subsequently signals to deduplication backup client 256 to send all of the segments over (not shown) and deduplication backup client 256 sends all of the segments (i.e., $S_1$, $S_2$, $S_3$, $S_4$, $S_5$, $S_6$, and $S_7$) to backup storage interface 206.

After the backup is performed, the client-side cache is updated to the state shown in diagram 420. The first entry corresponds to the first group fingerprint, the second entry corresponds to the second group fingerprint, and the third entry corresponds to the third group fingerprint. Each entry includes a group fingerprint (e.g., $Hash_2(Hash_1(S_1), Hash_1(S_2))$ in the case of the first entry), the previous backup which includes the protected data associated with that particular group fingerprint (e.g., $BU_1$), an offset within that backup (e.g., 0 in the case of the first entry), and the length beginning from the specified offset (e.g., $L_1$ in the case of the first entry). As is shown in the FIG. 2, segments $S_1$ and $S_2$ have a combined length of $L_1$, segments $S_3$ and $S_4$ have a combined length of $L_2$, and segments $S_5$-$S_7$ have a combined length of $L_3$. From these lengths, the offsets and lengths shown in diagram 420 may be obtained.

Figure 5:
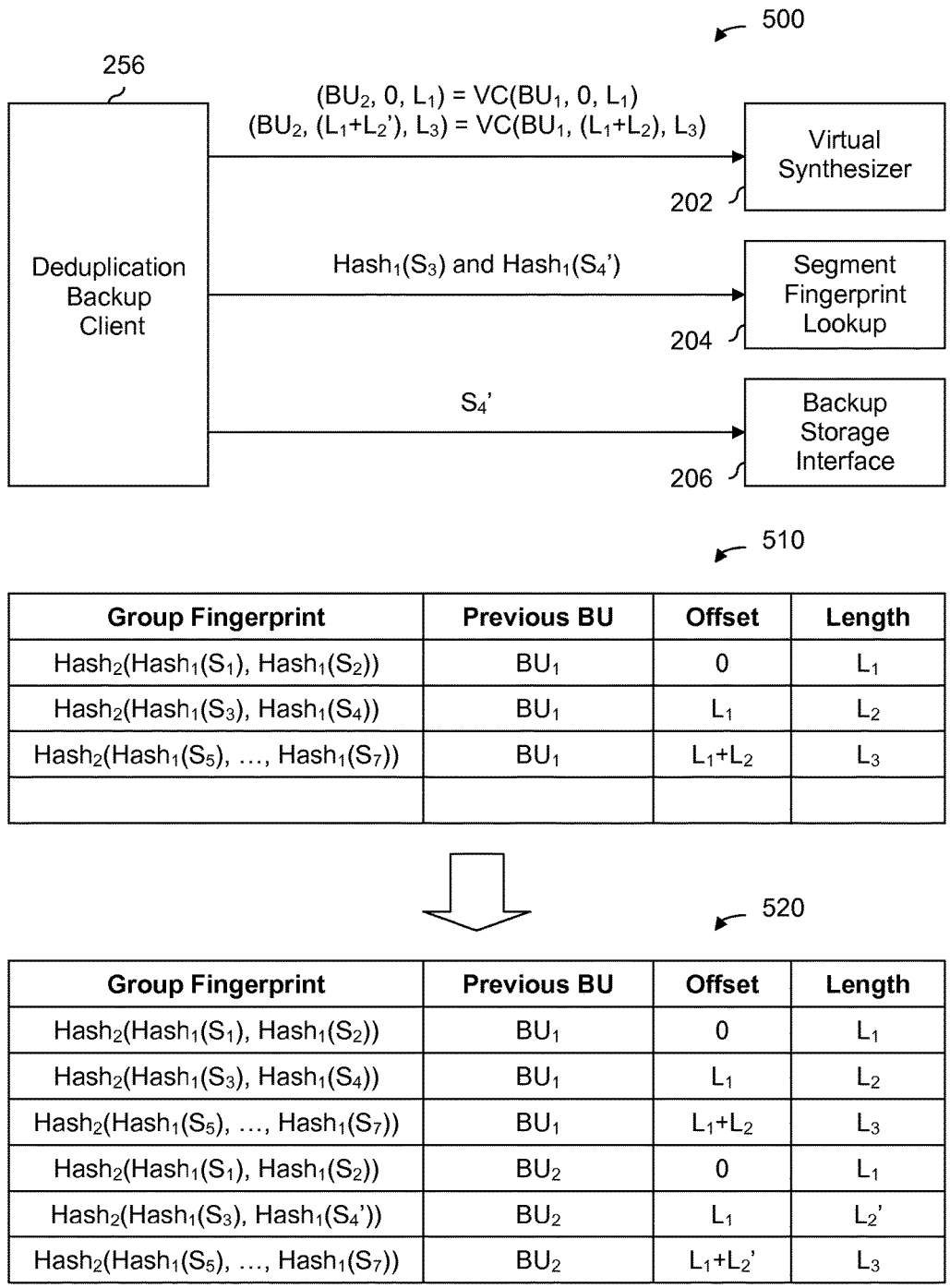
FIG. 5 is a diagram illustrating an embodiment of a second backup.

FIG. 5 is a diagram illustrating an embodiment of a second backup. This example continues the example of FIG. 4, with new information having been added since the first backup such that the segment $S_4$ becomes $S_4'$. This backup is referred to as $BU_2$.

Diagram 510 shows the client-side cache before the second backup is performed. The $S_1$, $S_2$, $S_5$, $S_6$, and $S_7$ segments have not changed since the first backup. As a result, the first group fingerprint (i.e., $Hash_2(Hash_1(S_1), Hash_1(S_2))$) and third group fingerprint (i.e., $Hash_2(Hash_1(S_5), Hash_1(S_6), Hash_1(S_7))$) remain the same and are found in the client-side cache in diagram 510.

As a result, deduplication backup client 256 sends two virtual copy instructions to virtual synthesizer 202 in diagram 500. (Note that the two virtual copy instructions cannot be consolidated into a single virtual copy instruction since the relevant data is not adjacent to each other within the previous backup.) In the first virtual copy command, the current backup (i.e., $BU_2$) beginning at an offset of 0 and having a length of $L_1$ is identical to previous backup $BU_1$ beginning from an offset of 0 and having a length of $L_1$. In the second virtual copy command, the current backup (i.e., $BU_2$) beginning at an offset of $(L_1+L_2')$ and having a length of $L_3$, is identical to previous backup $BU_1$ beginning from an offset of $(L_1+L_2)$ and having a length of $L_3$.

The second group fingerprint (i.e., $Hash_2(Hash_1(S_3), Hash_1(S_4'))$) does not match the group fingerprint in the second entry (i.e., $Hash_2(Hash_1(S_3), Hash_1(S_4))$) and as such a virtual copy cannot be performed for that group fingerprint.

As such, in diagram 500, deduplication backup client 256 sends the (segment) fingerprints $Hash_1(S_3)$ and $Hash_1(S_4')$ to segment fingerprint lookup 204. Segment fingerprint lookup 204 is able to find the former but will not be able to find the latter. Deduplication backup client 256 is then requested (not shown) to send segment $S_4'$ to backup storage interface 206 and accordingly does so.

Diagram 520 shows the client-side cache updated after the second backup. In this example, the first, second, and third entries (created after the first backup $BU_1$) remain in the cache. In addition, 3 new entries (corresponding to the second backup $BU_2$) are added to the cache. Note that in the example of diagram 520, new entries are added to the cache without taking into consideration whether there was a cache hit for the corresponding group fingerprint (e.g., as was the case for the group fingerprint for the $S_1$ and $S_2$ segments) or if there was a cache miss for the corresponding group fingerprint (e.g., as was the case for the group fingerprint for the $S_3$ and $S_4'$ segments). Rather, new entries are created and added to the cache for all group fingerprints that existing during the backup which was just performed.

In some applications this type of cache update is attractive because it is easy to implement. The update is done this way so when a first backup (e.g., $BU_1$) expires, we still have the group fingerprints in another backup (e.g., $BU_2$). If only the incremental changes were implemented, then the base backup expiry means that there would no longer be any match.

In some embodiments, the organization of the entries may be different compared to that shown in order to save space. For example, entries that belong to the same fingerprint may be combined in one entry where the different previous backups and different offsets may be in corresponding columns or in some array.

In some embodiments, if a group fingerprint is associated with multiple backups in the cache, the backup that is flagged is the latest or most recent backup associated with that group fingerprint. For example, if the next backup is $BU_3$ and the group fingerprint in question is located in the cache and is associated with both $BU_1$ and $BU_2$ (where $BU_1$ is an earlier backup and $BU_2$ is a more recent backup), then the flagged backup (and which is used in a future virtual copy command) is the $BU_2$ backup, not the $BU_1$ backup. This may be attractive for a variety of reasons, such as increasing the likelihood that flagged group fingerprints are adjacent to each other and thus increasing the likelihood that multiple, shorter virtual copy commands can be consolidated in to a single, longer virtual copy command.

As is shown here, because group fingerprints are stored in the cache (e.g., as opposed to individual fingerprints corresponding to a single segment) fewer entries are stored in the cache. This makes the cache both smaller and easier to manage. Also, it is not uncommon for protected system to be very large but have very few changes. Furthermore, those changes tend to be localized. Group fingerprints work well in such environments since only a few group fingerprints will have a cache miss because of the localized nature of the changes. To put it another way, the techniques described herein would not work so well if changes were distributed or sprinkled evenly throughout the system, which would cause many group fingerprints to have a cache miss.

In the examples described above, it has been assumed that the information stored in the cache is up to date. In some embodiments, the following process is performed (e.g., by a deduplication backup client) before checking for any group fingerprints in a cache to ensure that the information in the cache is accurate and does not reference a backed up file that does not exist.

Figure 6:
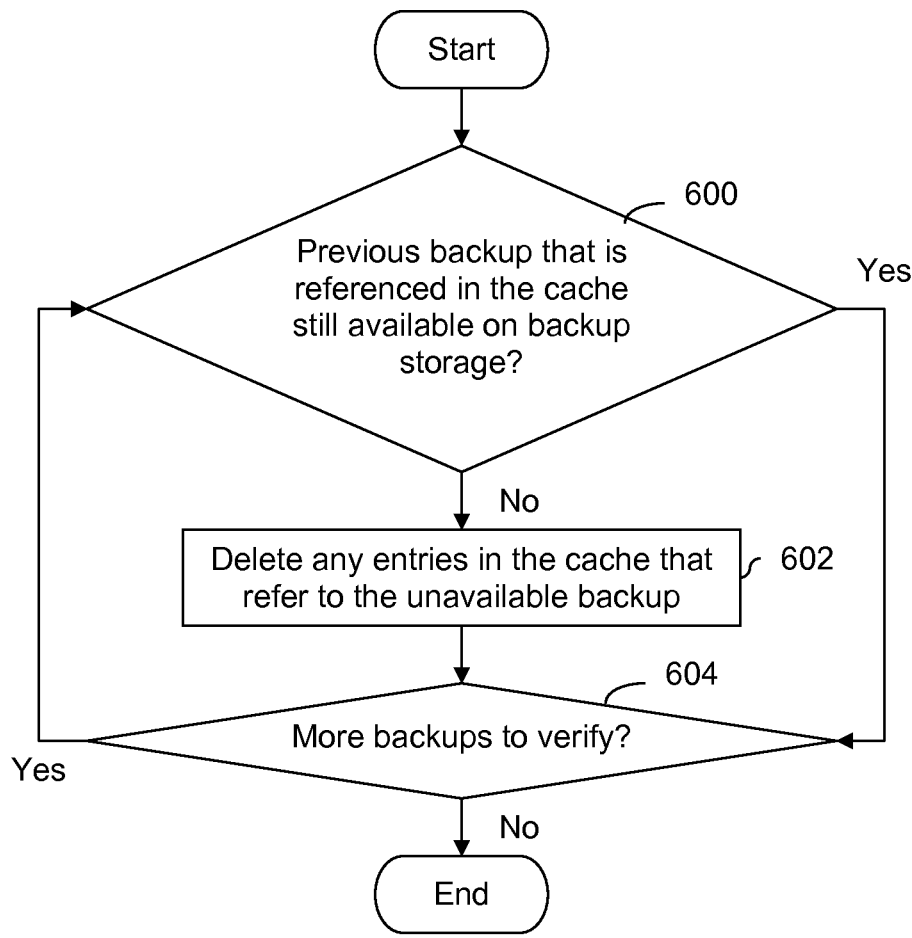
FIG. 6 is a flowchart illustrating an embodiment of a process for verifying a client-side cache.

FIG. 6 is a flowchart illustrating an embodiment of a process for verifying a client-side cache. In some embodiments, the process shown here is performed before performing the process shown in FIGS. 1A and 1B. In some embodiments, the process is performed by a deduplication backup client running on a protected device. Performing such a verification process before a deduplication backup is performed ensures that any backups referred to in the client-side cache still exist. It would not, for example, be desirable to instruct a deduplication backup server to perform a virtual copy on a backup that no longer exists.

At 600, it is determined if a previous backup that is referenced in the cache is still available on backup storage. For example, to save space on a deduplication backup server, the backup $BU_1$ may have been deleted to save space. In one example, backups are stored in deduplication backup storage 230 in FIG. 2 and deduplication backup storage 230 is queried if a particular backup is still available.

If it is determined at step 600 that the backup is no longer available on backup storage, any entries in the cache that refer to the unavailable backup are deleted at 602. To continue the example from above, if backup $BU_1$ is no longer available on backup storage (e.g., because it was deleted to make space for newer backups) then the first three entries would be deleted from the cache shown in diagram 520 in FIG. 5 since they refer to the $BU_1$ backup.

After deletion at step 602, or if it is determined at step 600 that the backup is still available on backup storage, it is determined at 604 if there are more backups to verify. For example, a list of backups referenced by entries in the cache may be managed or extracted on-the-fly from the cache. If so, the check at step 600 is repeated for another backup. Otherwise, the process ends.

As is shown in FIG. 6, one advantage of the techniques described herein is that they reference or (more generally) deal with a single (e.g., monolithic) backup file as opposed to backed up segments. As a result, fewer things need to be checked during a verification process to ensure that the backup data being referred to still exists. If the techniques described herein had dealt with backed up segments instead, then many more entries would need to be checked (because each entry would correspond to a single segment and there are many segments per file) and the verification process would be much slower.

The following figures describe some optional features or characteristics that a cache may employ if desired. These features may enable faster processing or prevent certain types of virtual copy errors from occurring.

Figure 7:
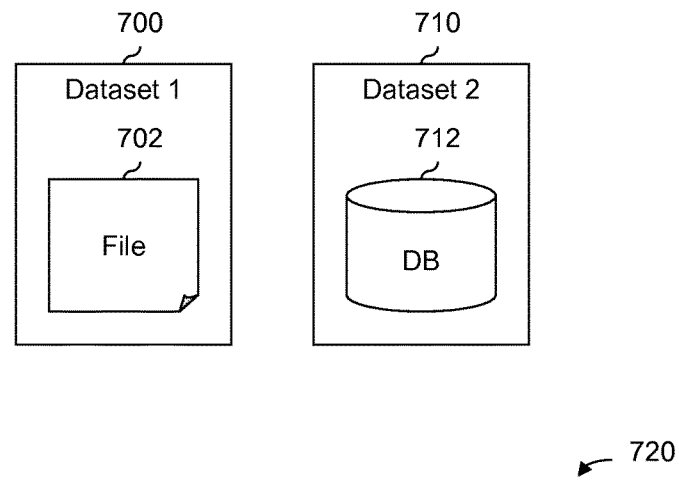
FIG. 7 is a diagram illustrating an embodiment of separate caches for different datasets.

FIG. 7 is a diagram illustrating an embodiment of separate caches for different datasets. In the example shown, each dataset may correspond to a different location or area of a protected device or protected network, such that the first dataset (700) includes one or more files (702) and the second dataset (710) includes a database (712). In some cases, each dataset has a different backup frequency (e.g., first dataset 700 is backed up every day whereas second dataset 710 is backed up once a week) and/or each dataset may have a different retention period (e.g., backups of first dataset 700 are kept for 3 days whereas backups of second dataset 710 are kept for 2 weeks). In some embodiments, datasets are defined according to platform (e.g., one dataset is for Windows protected data and another dataset is for LINUX protected data). In some embodiments, datasets are user defined.

In some embodiments, a cache is implemented as multiple, independent caches where each cache corresponds to a different dataset. In this example, cache 720 corresponds to the first dataset (700) and cache 730 corresponds to the second dataset (710). In both cache 720 and cache 730, a single backup has been performed ($BU_{Dataset1,1}$ and $BU_{Dataset2,1}$, respectively) and each backup includes two group fingerprints ($GF_{Dataset1,1}$ and $GF_{Dataset1,2}$ for the first dataset and $GF_{Dataset2,1}$ and $GF_{Dataset2,2}$ for the second dataset).

Referring back to the process of FIGS. 1A and 1B, if a backup of first dataset 700 is being performed, then cache 720 would be checked for group fingerprints and cache 730 would be ignored. Similarly, if a backup of second dataset 710 is being performed, then cache 730 would be checked for group fingerprints and cache 720 would be ignored. Having multiple, independent caches that correspond to different datasets makes the backup process of FIGS. 1A and 1B faster because a smaller cache is being searched.

Figure 8:
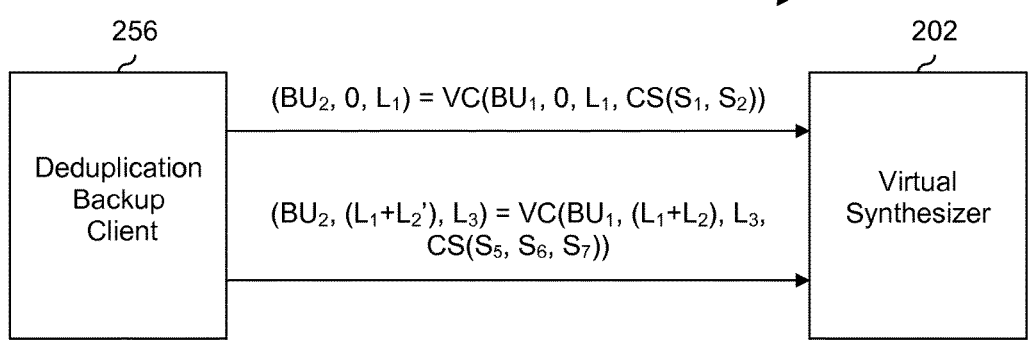
FIG. 8 is a diagram illustrating an embodiment of a cache which includes a checksum.

FIG. 8 is a diagram illustrating an embodiment of a cache which includes a checksum. In the example shown, each entry in cache 800 includes a checksum field. The checksum is a generated based on the contents of the corresponding segments. For example, the first entry in cache 800 has a checksum which is based on $S_1$ and $S_2$, the second entry in cache 800 has a checksum which is based on $S_3$ and $S_4$, and the third entry in cache 800 has a checksum which is based on $S_5$, $S_6$, and $S_7$. In some applications, using multiple caches is attractive because it can decrease the amount of memory needed. For example, if the caches are kept on the client storage device(s) and only the relevant one is loaded onto memory, this would reduce the amount of memory required.

In one example, the checksum is a parity checksum. For example, suppose $S_1$=011 and $S_2$=100. The chunks are then XORed to obtain the checksum. For example, the checksum in the above example would be 011 XOR 100=111. In general, the checksum tends to be relatively small.

As is shown in diagram 850, a checksum is passed from deduplication backup client 256 to virtual synthesizer 202 with each virtual copy instruction. Diagram 850 is similar to the communication(s) exchanged between deduplication backup client 256 and virtual synthesizer 202 in diagram 500 in FIG. 5, except a checksum is also exchanged. (Note that segment fingerprint lookup 204 and backup storage interface 206 from FIG. 5 and the information exchanged with those components are not shown in FIG. 8 for clarity.) In FIG. 5, the virtual copy instructions have 3 inputs, whereas the virtual copy instructions in FIG. 8 have 4 inputs.

In this example, virtual synthesizer 202 uses the checksum to verify that the proper previous backup, proper offset, and proper length have been specified by deduplication backup client 256. Virtual synthesizer 202 uses the specified previous backup, specified offset, and specified length to calculate its own checksum. This calculated checksum is then compared against the checksum received from deduplication backup client 256. If they match, then the virtual copy is good. If they do not match, then the virtual copy is improper.

In some embodiments, checksum mismatches are treated as a fatal error and the backup is terminated.

In some embodiments, entries in a cache corresponding to the oldest backups are removed in order to make room for new entries corresponding to the newest backup. The following figure shows one example of this.

Figure 9:
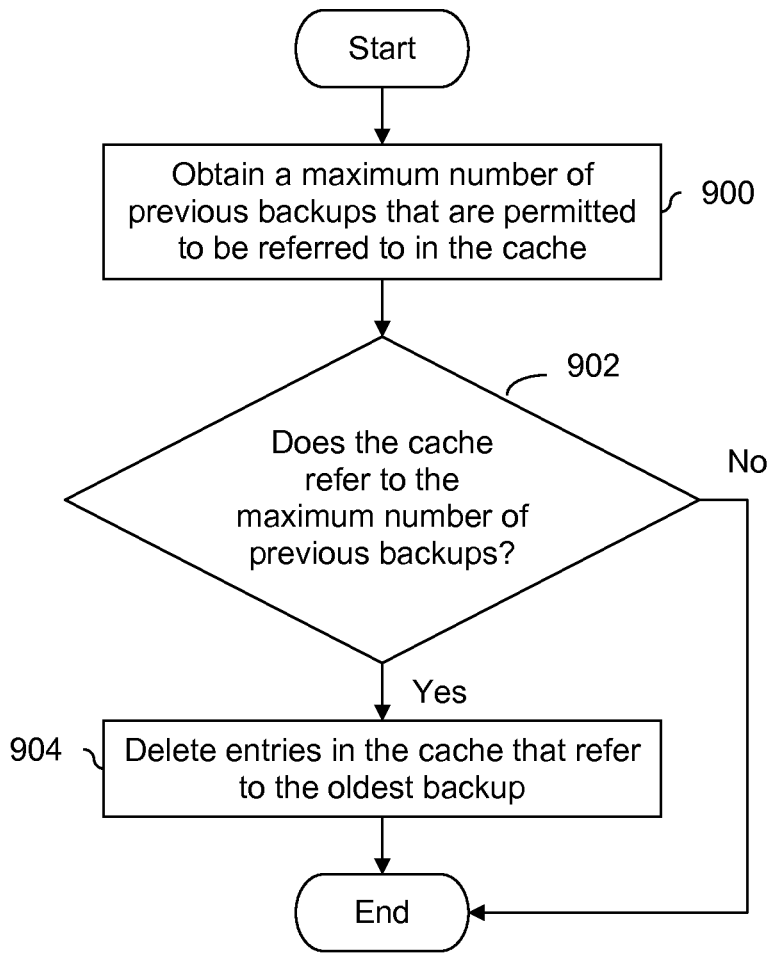
FIG. 9 is a flowchart illustrating an embodiment of a process for removing entries from a cache.

FIG. 9 is a flowchart illustrating an embodiment of a process for removing entries from a cache. For example, the process may be performed before new entries (e.g., corresponding to the most recently performed backup) are added to the cache in order to make room for those new entries. In some embodiments, the process is performed by a deduplication backup client.

At 900, a maximum number of previous backups that are permitted to be referred to in the cache is obtained. For example, the cache may refer to at most 4 previous backups, or at most 16 previous backups. At 902, it is determined if the cache refers to the maximum number of previous backups. For example, if $N_{max}=4$ and the entries in the cache refer to previous backups $BU_1$, $BU_2$, $BU_3$, and $BU_4$ then some entries will need to be deleted in order to make room for the new entries corresponding to the current/most recent backup. In the case of multiple caches (e.g., where there is a cache for each dataset) the maximum number of backups will apply to each cache separately.

If it is determined at 902 that the cache refers to the maximum number of previous backups, then entries in the cache that refer to the oldest backup are deleted at 904. For example, if $N_{max}=4$ and the entries in the cache refer to previous backups $BU_1$, $BU_2$, $BU_3$, and $BU_4$ where $BU_1$ is the oldest backup and $BU_4$ is the most recent backup, then all entries which refer to $BU_1$ are deleted. If it is determined at 902 that the cache does not refer to the maximum number of previous backups, then the process ends (e.g., because there is still space in the cache and no entries need to be deleted).

In some embodiments (e.g., in addition to or as an alternative to having backup expiry from the cache be dependent upon a maximum number of previous backups), backup expiry from the cache depends upon the current size of the cache (e.g., it is permitted to grow as long as the configured parameters allow it).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a deduplication backup client on a protected device, configured to:
   divide protected data into a plurality of segments;
   for each segment in the plurality of segments, generate a fingerprint;
   group the plurality of fingerprints into a first group of fingerprints and a second group of fingerprints;
   generate a first group fingerprint for the first group of fingerprints and a second group fingerprint for the second group of fingerprints;
   determine if the first group fingerprint is stored in a cache on the protected device; and
   in the event it is determined that the first group fingerprint is stored in the cache:
      flag the first group fingerprint as one for which a virtual copy will be performed, wherein an instruction to perform a virtual copy associated with the first group fingerprint is not sent until it is determined if the second group fingerprint is stored in the cache;
      determine if the second group fingerprint is stored in the cache;
      in the event it is determined that the first group fingerprint is stored in the cache and it is determined that the second group fingerprint is stored in the cache;
         determine if a first set of protected data, which is associated with the first group fingerprint, is adjacent to a second set of protected data, which is associated with the second group fingerprint, within a same previous backup such that both the first set of protected data and the second set of protected data are able to be referenced using a consolidated instruction which includes a single previous backup, a single offset, and a single length; and
         in the event it is determined that the first group fingerprint is stored in the cache, it is determined that the second group fingerprint is stored in the cache, and it is determined that the first set of protected data is adjacent to the second set of protected data within the same previous backup, send the consolidated instruction to perform a virtual copy associated with both the first set of protected data which is associated with the first group fingerprint and the second set of protected data which is associated with the second group fingerprint; and
      in the event it is determined that the first group fingerprint is stored in the cache and it is determined that the second group fingerprint is not stored in the cache, send an instruction to perform a virtual copy associated with the first set of protected data which is associated with the first group fingerprint and not associated with the second set of protected data which is associated with the second group fingerprint; and
   the cache on the protected device.

2. The system of claim 1, wherein the deduplication backup client is further configured to, in the event it is determined that the first group fingerprint is not stored in the cache:
   instruct a deduplication backup server to perform one or more virtual copies associated with any group fingerprints that have been flagged and for which a virtual copy has not yet been performed;
   send a fingerprint from the first group fingerprint not stored in the cache to the deduplication backup server;
   determine if the deduplication backup server indicates that the segment corresponding to the fingerprint is already backed up; and in the event the deduplication backup server indicates that the segment corresponding to the fingerprint is not already backed up, send the segment corresponding to the fingerprint to the deduplication backup server.

3. The system of claim 1, wherein the deduplication backup client is configured to perform one or more of the following using an anchoring process: divide the protected data or group the plurality of fingerprints.

4. The system of claim 3, wherein the deduplication backup client is further configured to:
obtain one or more environmental inputs, including one or more of the following: an amount of memory allocated for the cache, an amount of protected data, and a desired cache hit rate; and
determine one or more settings for the anchoring process associated with controlling the size of a group of fingerprints based at least in part on the environmental inputs.

5. The system of claim 1, wherein the deduplication backup client is configured to perform one or more of the following using a hash: generate the fingerprint or generate the first group fingerprint for the first group of fingerprints and the second group fingerprint for the second group of fingerprints.

6. The system of claim 1, wherein the deduplication backup client is further configured to:
determine if a previous backup that is referenced in the cache is still available on backup storage; and
in the event it is determined the previous backup that is referenced in the cache is no longer available on backup storage, delete any entries in the cache that refer to the unavailable backup.

7. The system of claim 1, wherein:
the cache is a first cache that is associated with a first dataset; and
there is a second cache that is associated with a second dataset.

8. The system of claim 1, wherein the deduplication backup client is further configured to:
obtain a maximum number of previous backups that are permitted to be referred to in the cache;
determine if the cache refers to the maximum number of previous backups; and
in the event it is determined that the cache refers to the maximum number of previous backups, delete entries in the cache that refer to the oldest backup.

9. The system of claim 1, wherein:
the same previous backup in which the first set of protected data is adjacent to the second set of protected data is stored on a deduplication backup storage managed by a deduplication backup server; and
sending the consolidated instruction includes sending the consolidated instruction from the protected device to the deduplication backup server.

10. A method, comprising:
dividing protected data into a plurality of segments;
for each segment in the plurality of segments, generating a fingerprint;
grouping the plurality of fingerprints into a first group of fingerprints and a second group of fingerprints;
generating a first group fingerprint for the first group of fingerprints and a second group fingerprint for the second group of fingerprints;
using a processor to determine if the first group fingerprint is stored in a cache on a protected device; and in the event it is determined that the first group fingerprint is stored in the cache:
flagging the group fingerprint being processed as one for which a virtual copy will be performed, wherein an instruction to perform a virtual copy associated with the first group fingerprint is not sent until it is determined if the second group fingerprint is stored in the cache;
determining if the second group fingerprint is stored in the cache;
in the event it is determined that the first group fingerprint is stored in the cache and it is determined that the second group fingerprint is stored in the cache:
determining if a first set of protected data, which is associated with the first group fingerprint, is adjacent to a second set of protected data, which is associated with the second group fingerprint, within a same previous backup such that both the first set of protected data and the second set of protected data are able to be referenced using a consolidated instruction which includes a single previous backup a single offset and a single length; and
in the event it is determined that the first group fingerprint is stored in the cache, it is determined that the second group fingerprint is stored in the cache, and it is determined that the first set of protected data is adjacent to the second set of protected data within the same previous backup, sending the consolidated instruction to perform a virtual copy associated with both the first set of protected data which is associated with the first group fingerprint and the second set of protected data which is associated with the second group fingerprint; and
in the event it is determined that the first group fingerprint is stored in the cache and it is determined that the second group fingerprint is not stored in the cache, sending an instruction to perform a virtual copy associated with the first set of protected data which is associated with the first group fingerprint and not associated with the second set of protected data which is associated with the second group fingerprint.

11. The method of claim 10 further comprising in the event it is determined that the first group fingerprint is not stored in the cache:
instructing a deduplication backup server to perform one or more virtual copies associated with any group fingerprints that have been flagged and for which a virtual copy has not yet been performed;
sending a fingerprint from the first group fingerprint not stored in the cache to the deduplication backup server;
determining if the deduplication backup server indicates that the segment corresponding to the fingerprint is already backed up; and
in the event the deduplication backup server indicates that the segment corresponding to the fingerprint is not already backed up, sending the segment corresponding to the fingerprint to the deduplication backup server.

12. The method of claim 10 further comprising:
determining if a previous backup that is referenced in the cache is still available on backup storage; and
in the event it is determined the previous backup that is referenced in the cache is no longer available on backup storage, deleting any entries in the cache that refer to the unavailable backup.

13. The method of claim 10 further comprising:
obtaining a maximum number of previous backups that are permitted to be referred to in the cache;
determining if the cache refers to the maximum number of previous backups; and
in the event it is determined that the cache refers to the maximum number of previous backups, deleting entries in the cache that refer to the oldest backup.

14. The method of claim 10 further comprising performing one or more of the following using an anchoring process: divide the protected data or group the plurality of fingerprints.

15. The method of claim 14 further comprising:
obtaining one or more environmental inputs, including one or more of the following: an amount of memory allocated for the cache, an amount of protected data, and a desired cache hit rate; and
determining one or more settings for the anchoring process associated with controlling the size of a group of fingerprints based at least in part on the environmental inputs.

16. The method of claim 10, wherein:
the same previous backup in which the first set of protected data is adjacent to the second set of protected data is stored on a deduplication backup storage managed by a deduplication backup server; and
sending the consolidated instruction includes sending the consolidated instruction from the protected device to the deduplication backup server.

17. A computer program product, the computer program product being embodied in a non-transitory computer readable storage medium and comprising computer instructions for:
dividing protected data into a plurality of segments;
for each segment in the plurality of segments, generating a fingerprint;
grouping the plurality of fingerprints into a first group of fingerprints and a second group of fingerprints;
generating a first group fingerprint for the first group of fingerprints and a second group fingerprint for the second group of fingerprints;
determining if the first group fingerprint is stored in a cache on a protected device; and
in the event it is determined that the first group fingerprint is stored in the cache:
flagging the first group fingerprint as one for which a virtual copy will be performed, wherein an instruction to perform a virtual copy associated with the first group fingerprint is not sent until it is determined if the second group fingerprint is stored in the cache;
determining if the second group fingerprint is stored in the cache;
in the event it is determined that the first group fingerprint is stored in the cache and it is determined that the second group fingerprint is stored in the cache:
determining if a first set of protected data, which is associated with the first group fingerprint, is adjacent to a second set of protected data, which is associated with the second group fingerprint, within a same previous backup such that both the first set of protected data and the second set of protected data are able to be referenced using a consolidated instruction which includes a single previous backup a single offset and a single length; and
in the event it is determined that the first group fingerprint is stored in the cache, it is determined that the second group fingerprint is stored in the cache, and it is determined that the first set of protected data is adjacent to the second set of protected data within the same previous backup, sending the consolidated instruction to perform a virtual copy associated with both the first set of protected data which is associated with the first group fingerprint and the second set of protected data which is associated with the second group fingerprint; and
in the event it is determined that the first group fingerprint is stored in the cache and it is determined that the second group fingerprint is not stored in the cache, sending an instruction to perform a virtual copy associated with the first set of protected data which is associated with the first group fingerprint and not associated with the second set of protected data which is associated with the second group fingerprint.

18. The computer program product of claim 17 further comprising computer instructions for: in the event it is determined that the first group fingerprint is not stored in the cache:
instructing a deduplication backup server to perform one or more virtual copies associated with any group fingerprints that have been flagged and for which a virtual copy has not yet been performed;
sending a fingerprint from the first group fingerprint not stored in the cache to the deduplication backup server;
determining if the deduplication backup server indicates that the segment corresponding to the fingerprint is already backed up; and
in the event the deduplication backup server indicates that the segment corresponding to the fingerprint is not already backed up, sending the segment corresponding to the fingerprint to the deduplication backup server.

19. The computer program product of claim 17 further comprising computer instructions for:
determining if a previous backup that is referenced in the cache is still available on backup storage; and
in the event it is determined the previous backup that is referenced in the cache is no longer available on backup storage, deleting any entries in the cache that refer to the unavailable backup.

20. The computer program product of claim 17 further comprising computer instructions for:
obtaining a maximum number of previous backups that are permitted to be referred to in the cache;
determining if the cache refers to the maximum number of previous backups; and
in the event it is determined that the cache refers to the maximum number of previous backups, deleting entries in the cache that refer to the oldest backup.

21. The computer program product of claim 17 further comprising computer instructions for performing one or more of the following using an anchoring process: divide the protected data or group the plurality of fingerprints.

22. The computer program product of claim 21 further comprising computer instructions for:
obtaining one or more environmental inputs, including one or more of the following: an amount of memory allocated for the cache, an amount of protected data, and a desired cache hit rate; and determining one or more settings for the anchoring process associated with controlling the size of a group of fingerprints based at least in part on the environmental inputs.

23. The computer program product of claim 17, wherein:

the same previous backup in which the first set of protected data is adjacent to the second set of protected data is stored on a deduplication backup storage managed by a deduplication backup server; and sending the consolidated instruction includes sending the consolidated instruction from the protected device to the deduplication backup server.

\* \* \* \* \*

UNITED STATES PATENT AND TRADEMARK OFFICE
CERTIFICATE OF CORRECTION

PATENT NO. : 10,346,256 B1
APPLICATION NO. : 14/577469
DATED : July 9, 2019
INVENTOR(S) : Orit Levin-Michael et al.

Page 1 of 1

It is certified that error appears in the above-identified patent and that said Letters Patent is hereby corrected as shown below:

In the Specification

In Column 6, Line 42 & 43, delete "BU previous" and insert --$BU_{previous}$--, therefor.

In the Claims

In Column 12, Line 21, after "cache", delete ";" and insert --:--, therefor.

In Column 14, Line 22, after "backup", insert --,--.

In Column 14, Line 22, after "offset", insert --,--.

In Column 15, Line 66, after "backup", insert --,--.

In Column 15, Line 66, after "offset", insert --,--.

Signed and Sealed this
Eighteenth Day of February, 2020

Andrei Iancu
*Director of the United States Patent and Trademark Office*